F. W. FLAGG.
MACHINERY CLUTCHES.
No. 179,692. Patented July 11, 1876.
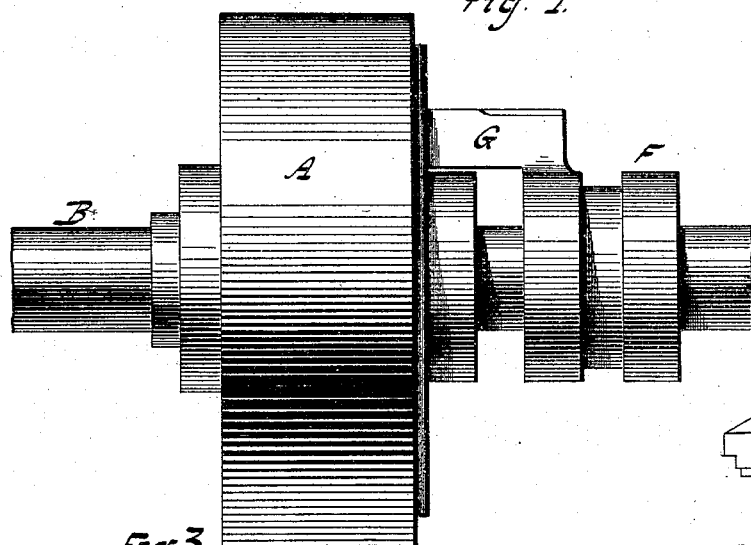
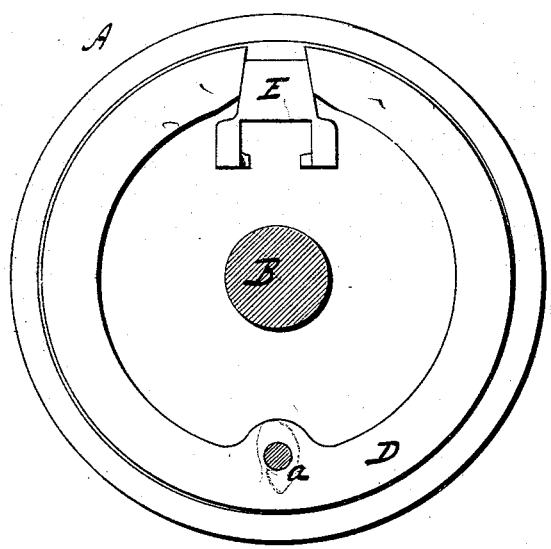
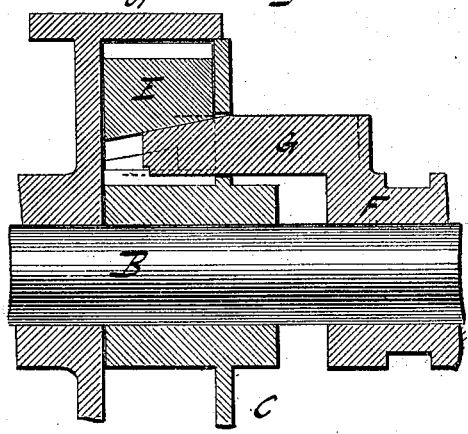
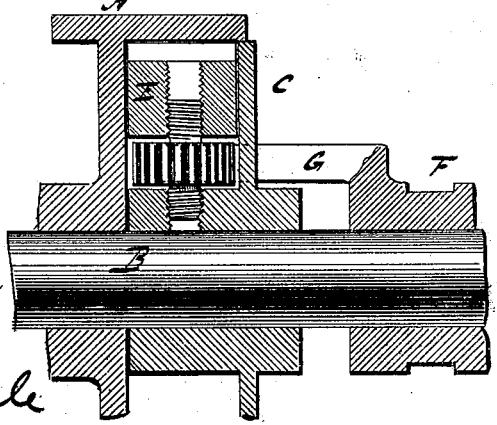
Witnesses.
J. H. Shumway.
Clara Broughton.
Fred'k W. Flagg.
By Atty. Inventor

UNITED STATES PATENT OFFICE.

FREDERICK W. FLAGG, OF MIDDLETOWN, CONNECTICUT.

IMPROVEMENT IN MACHINERY-CLUTCHES.

Specification forming part of Letters Patent No. 179,692, dated July 11, 1876; application filed November 16, 1875.

*To all whom it may concern:*

Be it known that I, FREDERICK W. FLAGG, of Middletown, in the county of Middlesex and State of Connecticut, have invented a new Improvement in Machinery-Clutch; and I do hereby declare the following, when taken in connection with the accompanying drawings and the letters of reference marked thereon, to be a full, clear, and exact description of the same, and which said drawings constitute part of this specification, and represent, in—

Figure 1, side view; Fig. 2, longitudinal section; Fig. 3, inside view; Fig. 4, modification.

This invention relates to an improvement in what are termed "machinery-clutches"— that is to say, a device by which a pulley loose on the shaft may be engaged with the shaft, or a pulley fast upon one shaft may be engaged or disengaged with a second shaft in the same line; and the invention consists in a divided frictional ring within the pulley, and fast at one point to a plate independent of the pulley, combined with a radial wedge and a longitudinal slide, so that the longitudinal movement of the said slide will expand or contract the internal divided ring to cause it to accordingly engage or disengage the pulley, as more fully hereinafter described.

A is a pulley, arranged loosely on the shaft B, the pulley being hollow, or faced upon its inside. C is a plate splined to the shaft B, and so as to work close to the edge of the pulley, or within it, and form a chamber within the pulley. To this plate a divided ring, D, is hung opposite the division, as at *a*. The ends of the ring at the division are inclined toward each other from the inside, and into this opening a wedge, E, is placed.

On the shaft a sliding collar, F, is arranged to be operated by the usual clutch-lever, and constructed with an arm, G, extending into the wedge E. The inner end of the arm G is inclined on the upper side, and an opening in the wedge is correspondingly inclined, so that as the arm G is forced inward, it will force the wedge between the two ends of the divided ring, and cause the ring to expand accordingly; and in order that the withdrawal of the arm G shall draw back the wedge E, the edges of the arm are formed with inclined ribs, as seen in Fig. 2ª, and the wedge with corresponding grooves, as seen in Fig. 3; hence the movement of the wedge is made positive.

Instead of the incline on the arm G, there may be introduced between the wedge and the hub of the plate C a pinion with a screw-axle, to work into a corresponding thread in the wedge, as seen in Fig. 4, so that the turning of the pinion by the movement of the arm G operates the wedge in substantially the same manner as does the incline before described.

While the pulley and clutch are represented as fixed to the same shaft, it will be understood that the pulley may be fixed to the end of one shaft, and the other portion fixed to the end of an adjoining shaft, so that, when coupled, both shafts will be driven together or released. They are free from each other, or the pulley may be tight upon the shaft and the other part loose.

By the expression "pulley" I wish to be understood as meaning one part of the clutch, which, by preference, and usually is, a pulley; but it may be a blank not intended for a pulley.

I do not wish to be understood as broadly claiming a friction-clutch in which the engagement is made by means of a wedge forced between the two ends of a divided ring, as such, I am aware, is not new.

I claim—

The combination of the pulley A, the divided ring D within, but independent of, the flange of the said pulley, the radial wedge E, the collar F, and arm G, the said arm G and wedge constructed as described, so that the longitudinal movement of the said arm, both toward and from the pulley, imparts a corresponding positive movement to said wedge, to cause respectively the expansion and contraction of the ring, all substantially as specified.

FREDERICK W. FLAGG.

Witnesses:
JOHN E. EARLE,
CLARA BROUGHTON.